(12) United States Patent
Choi et al.

(10) Patent No.: US 9,571,177 B2
(45) Date of Patent: Feb. 14, 2017

(54) COMMUNICATION METHOD OF MACRO BASE STATION, MACRO TERMINAL, MICRO BASE STATION, AND MICRO TERMINAL FOR INTERFERENCE CONTROL IN HIERARCHICAL CELLULAR NETWORK

(75) Inventors: Hyun Ho Choi, Suwon (KR); Won Jong Noh, Yongin (KR); Won Jae Shin, Yongin (KR); Chang Yong Shin, Seoul (KR); Kyung Hun Jang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 13/165,908

(22) Filed: Jun. 22, 2011

(65) Prior Publication Data

US 2012/0083282 A1 Apr. 5, 2012

(30) Foreign Application Priority Data

Oct. 4, 2010 (KR) ........................ 10-2010-0096279

(51) Int. Cl.
*H04B 7/06* (2006.01)
*H04B 7/02* (2006.01)
(Continued)

(52) U.S. Cl.
CPC ............ *H04B 7/0617* (2013.01); *H04B 7/022* (2013.01); *H04W 28/0236* (2013.01);
(Continued)

(58) Field of Classification Search
CPC .. H04W 84/045; H04W 16/32; H04W 52/244; H04W 72/082; H04W 72/1231; H04W 16/28
(Continued)

(56) References Cited

U.S. PATENT DOCUMENTS

2010/0029319 A1 2/2010 Higuchi et al.
2010/0074180 A1* 3/2010 Palanki ............ H04W 56/0015
370/328
(Continued)

FOREIGN PATENT DOCUMENTS

KR 10-2005-0083260 8/2005
KR 10-2010-0018777 2/2010
(Continued)

OTHER PUBLICATIONS

International Search Report mailed Apr. 20, 2012, issued in counterpart International Patent Application No. PCT/KR2011/007153; 3 pages.

*Primary Examiner* — George Eng
*Assistant Examiner* — Jing Gao
(74) *Attorney, Agent, or Firm* — NSIP Law

(57) ABSTRACT

A communication method of a macro base station, a macro terminal, a micro base station, and a micro terminal determines an interference control scheme for each interference condition between a micro cell and a micro cell and between a macro cell and a micro cell in a hierarchical cellular network, and controls interference in the hierarchical cellular network where a detailed operation for each determined interference control scheme, a message associated with the detailed operation, and a resource management scheme are defined.

10 Claims, 12 Drawing Sheets

(51) Int. Cl.
*H04W 28/02* (2009.01)
*H04W 16/32* (2009.01)
*H04B 17/345* (2015.01)

(52) U.S. Cl.
CPC ............ *H04B 7/063* (2013.01); *H04B 17/345* (2015.01); *H04W 16/32* (2013.01)

(58) Field of Classification Search
USPC ........................................................ 455/449
See application file for complete search history.

(56) References Cited

U.S. PATENT DOCUMENTS

| | | |
|---|---|---|
| 2010/0087203 A1 | 4/2010 | Lee et al. |
| 2010/0105404 A1* | 4/2010 | Palanki ................. H04L 1/0025 455/450 |
| 2010/0118827 A1 | 5/2010 | Sundaresan et al. |
| 2010/0118996 A1 | 5/2010 | Sundaresan et al. |
| 2010/0157934 A1 | 6/2010 | Tanno et al. |

FOREIGN PATENT DOCUMENTS

| | | | | |
|---|---|---|---|---|
| KR | 10-2010-0038558 | | 4/2010 | |
| KR | 10-2010-0059353 | | 6/2010 | |
| KR | 10-2010-0062209 A | | 6/2010 | |
| WO | WO 03/007645 | | 1/2003 | |
| WO | WO2010034358 | * | 4/2010 | ............ H04W 52/24 |
| WO | WO2012008957 | * | 1/2012 | ............ H04W 48/20 |
| WO | WO 2012/044328 A1 | * | 4/2012 | ............ H04W 36/20 |

\* cited by examiner

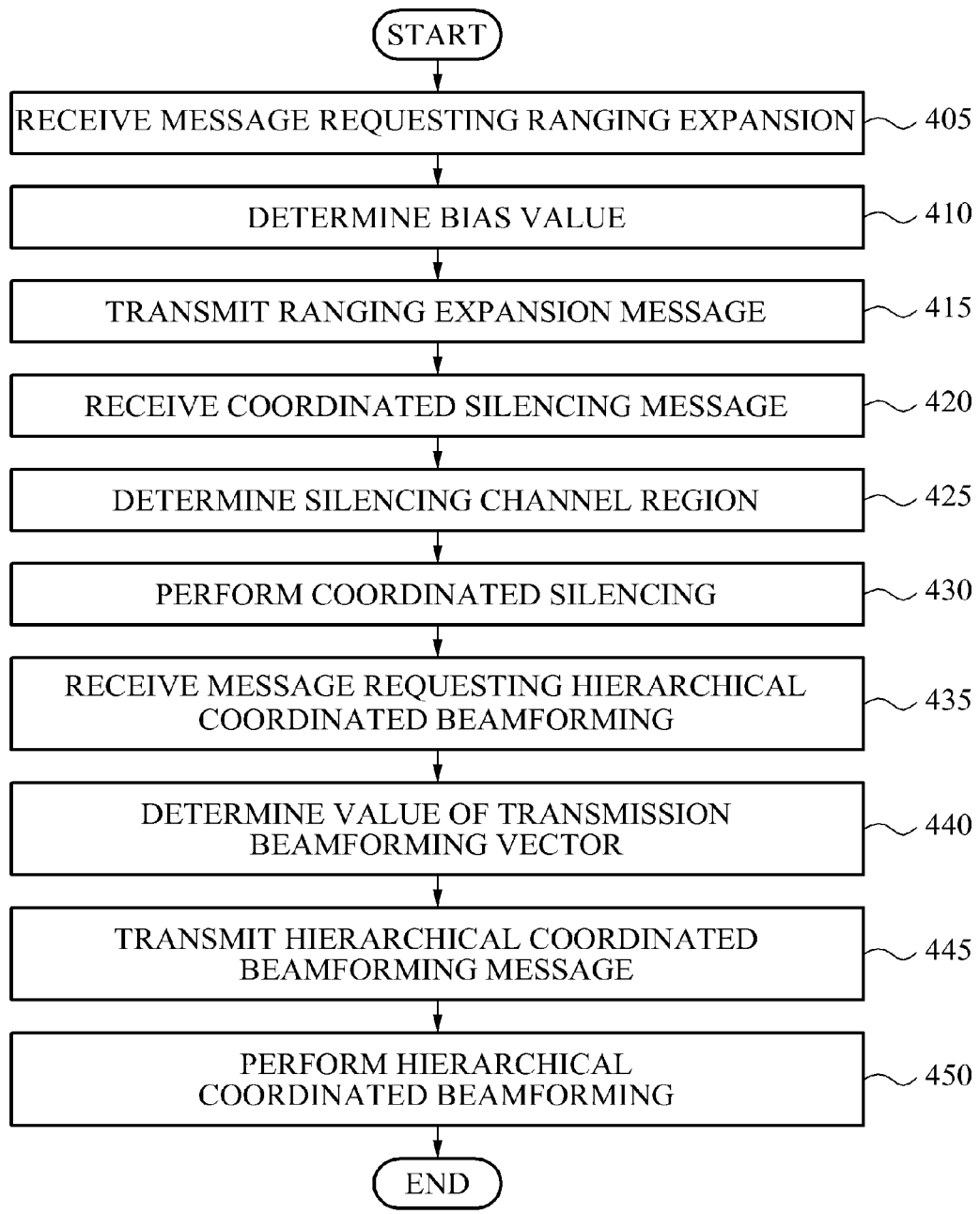

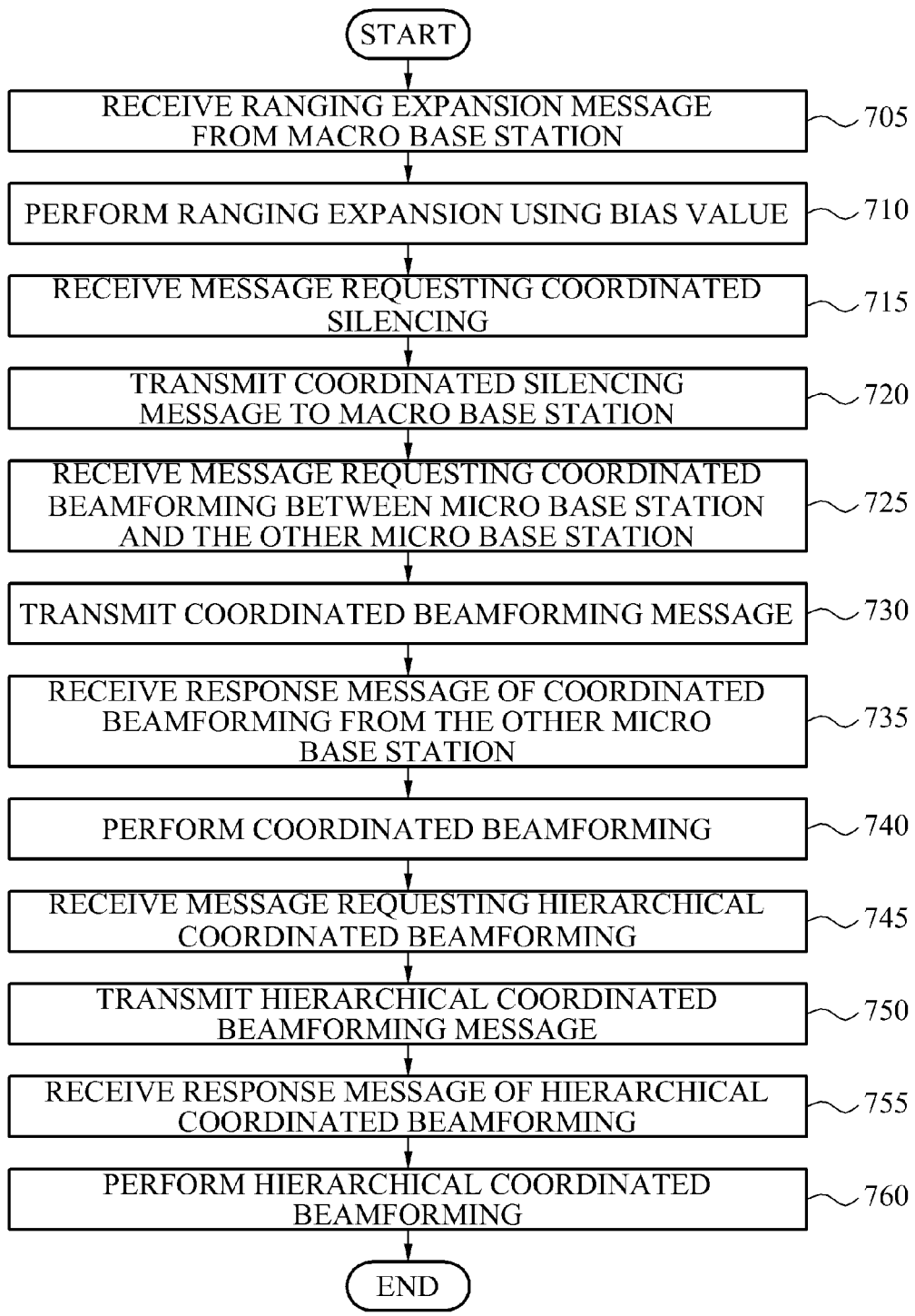

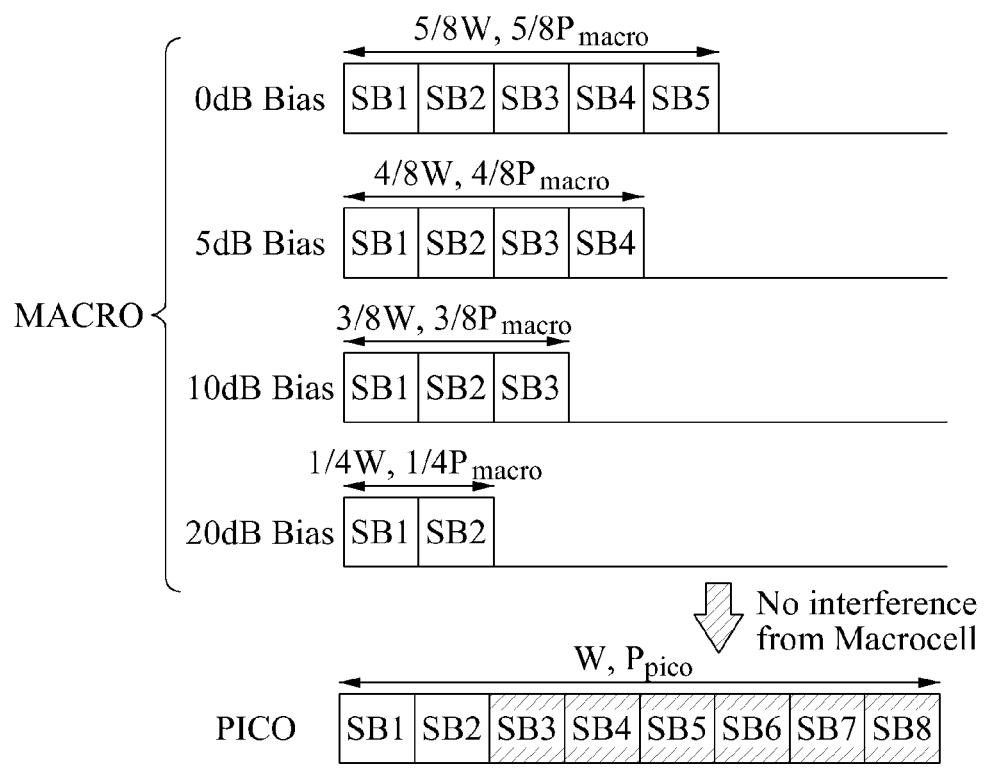

COMMUNICATION METHOD OF MACRO BASE STATION, MACRO TERMINAL, MICRO BASE STATION, AND MICRO TERMINAL FOR INTERFERENCE CONTROL IN HIERARCHICAL CELLULAR NETWORK

CROSS-REFERENCE TO RELATED APPLICATION(S)

This application claims the benefit under 35 U.S.C. §119 (a) of Korean Patent Application No. 10-2010-0096279, filed on Oct. 4, 2010, in the Korean Intellectual Property Office, the entire disclosure of which is incorporated herein by reference for all purposes.

BACKGROUND

1. Field

The following description relates to a communication method of a macro base station, a macro terminal, a micro base station, and a micro terminal for an interference control in a hierarchical cellular network.

2. Description of Related Art

Since a pico cell corresponding to a micro cell is configured in a hierarchical cellular network that is overlapped with a macro cell and generally provided inside the macro cell, interference may occur between the macro cell and the pico cell. When a number of pico cells are configured in the hierarchical cellular network, interference may occur between the pico cells.

SUMMARY

In one general aspect, there is provided a communication method of a macro base station for an interference control in a hierarchical cellular network including a macro base station serving at least one macro terminal, at least one micro base station serving a respective micro terminal, and at least one other micro base station, the method including receiving, from the macro terminal, a message requesting a ranging expansion and including bias values requested by the macro terminal, where a magnitude of a first interference from the micro base station to the macro terminal exceeds a predetermined first threshold value, determining a bias value used for the ranging expansion, based on the message requesting the ranging expansion, and transmitting, to the macro terminal and the micro base station, a ranging expansion message including the bias value, so that the macro terminal and the micro base station may perform the ranging expansion.

When a magnitude of a second interference from the macro base station to the micro terminal exceeds a predetermined second threshold value and a magnitude of a third interference from the other micro base station to the micro terminal is less than a predetermined third threshold value, the method may further include receiving, at the macro base station, a coordinated silencing message from the micro base station receiving from the micro terminal, a message requesting a coordinated silencing including information about an amount of interference of each of the second interference and the third interference and a communication quality of the micro terminal, determining a silencing channel region of the macro base station based on the message requesting the coordinated silencing, and performing the coordinated silencing with respect to the silencing channel region.

The coordinated silencing message may include at least one of information about a communication quality of each of the micro terminal and the micro base station, and a number of channels requesting the coordinated silencing.

The determining may further include dynamically varying the silencing channel region based on a load of a macro cell including the macro base station, the bias value, a transfer rate of the micro terminal, and a transfer rate of the macro terminal.

When a magnitude of a second interference from the macro base station to the micro terminal exceeds a predetermined second threshold value and a magnitude of a third interference from the other micro base station to the micro terminal exceeds a predetermined third threshold value, the method may further include receiving, at the macro base station, a message requesting a hierarchical coordinated beamforming from the micro base station receiving from the micro terminal, a message reporting that the hierarchical coordinated beamforming is requested, determining a value of a transmission beamforming vector used for the hierarchical coordinated beamforming based on the message requesting the hierarchical coordinated beamforming, transmitting, to each of the micro base station and the other micro base station, a hierarchical coordinated beamforming message including information about at least one of the value of the transmission beamforming vector, a start point of the hierarchical coordinated beamforming, and a resource region of the hierarchical coordinated beamforming, and performing the hierarchical coordinated beamforming based on the information about the at least one of the value of the transmission beamforming vector, the start point of the hierarchical coordinated beamforming, and the resource region of the hierarchical coordinated beamforming.

The message requesting the hierarchical coordinated beamforming may include at least one of an identification of a micro cell interfering with at least one micro terminal, a channel quality index of the micro base station, a precoding matrix index of the micro base station, and a value of channel state information of the micro base station.

In another aspect, there is provided a communication method of a macro terminal for an interference control in a hierarchical cellular network including a macro base station serving at least one macro terminal, at least one micro base station serving a respective micro terminal, and at least one other micro base station, the method including transmitting, to the macro base station, a message requesting a ranging expansion, where a magnitude of a first interference from the micro base station to the macro terminal exceeds a predetermined first threshold value, receiving, from the macro base station, a ranging expansion message including a bias value determined based on the message requesting the ranging expansion, and performing the ranging expansion using the bias value.

The message requesting the ranging expansion may include at least one of an amount of interference of the first interference, and a bias value requested by the macro terminal during the ranging expansion.

In still another aspect, there is provided a communication method of a micro terminal for an interference control in a hierarchical cellular network including a macro base station serving at least one macro terminal, at least one micro base station serving a respective micro terminal, and at least one other micro base station, the method including measuring a magnitude of a second interference from the macro base station to the micro terminal, and a magnitude of a third interference from the other micro base station to the micro terminal, and transmitting, to the micro base station, a message for controlling the second interference and the third interference based on the magnitude of the second interference and the magnitude of the third interference.

When the magnitude of the second interference exceeds a predetermined second threshold value and the magnitude of the third interference is less than a predetermined third threshold value, the transmitting may include transmitting, to the micro base station, a message requesting a coordinated silencing including information about at least one of an amount of interference of each of the second interference and the third interference, and a communication quality of each of the micro terminal and the micro base station, so as to request a performance of the coordinated silencing with respect to the macro base station.

When the magnitude of the second interference is less than a predetermined second threshold value and the magnitude of the third interference exceeds a predetermined third threshold value, the transmitting may include transmitting, to the micro base station, a message requesting a coordinated beamforming including at least one of an identification of a micro cell receiving the interference, an amount of interference from a neighboring micro cell, channel state information, a precoding matrix index, and a channel quality index, so as to request the other micro base station for a performance of the coordinated beamforming.

When the magnitude of the second interference exceeds a predetermined second threshold value and the magnitude of the third interference exceeds a predetermined third threshold value, the transmitting may include transmitting, to the macro base station, a message requesting a hierarchical coordinated beamforming including at least one of an identification of a micro cell receiving the interference from the micro base station, an amount of interference of each of the second interference and the third interference, channel state information, a precoding matrix index, and a channel quality index.

In yet another aspect, there is provided a communication method of a micro base station for an interference control in a hierarchical cellular network including a macro base station serving at least one macro terminal, at least one micro base station serving a respective micro terminal, and at least one other micro base station, the method including receiving a ranging expansion message from the macro base station receiving a message requesting a ranging expansion from the macro terminal, where a magnitude of a first interference from the micro base station to the macro terminal exceeds a predetermined first threshold value, and performing the ranging expansion using a bias value to be used for the ranging expansion and is included in the ranging expansion message.

When a magnitude of a second interference from the macro base station to the micro terminal exceeds a predetermined second threshold value and a magnitude of a third interference from the other micro base station to the micro terminal is less than a predetermined third threshold value, the method may further include receiving, from the micro terminal, a message requesting a coordinated silencing including information about at least one of an amount of interference of each of the second interference and the third interference, and a communication quality of each of the micro terminal and the micro base station, and transmitting the coordinated silencing message to the macro base station, in response to the message requesting the coordinated silencing, for the macro base station to perform the coordinated silencing, and the coordinated silencing message includes at least one of information about a communication quality of the micro terminal, and a number of channels requesting the coordinated silencing.

When a magnitude of a second interference from the macro base station to the micro terminal is less than a predetermined second threshold value and a magnitude of a third interference from the other micro base station to the micro terminal exceeds a predetermined third threshold value, the method may further include receiving, from the micro terminal, a message requesting a coordinated beamforming between the micro base station and the other micro base station, transmitting, to the other micro base station, a coordinated beamforming message including at least one of a precoding matrix index recommended for the coordinated beamforming and a restricted precoding matrix index, according to the message requesting the coordinated beamforming, receiving a response message of the coordinated beamforming from the other micro base station determining a transmission beamforming vector to perform the coordinated beamforming, and performing the coordinated beamforming based on the response message of the coordinated beamforming.

When a magnitude of a second interference from the macro base station to the micro terminal exceeds a predetermined second threshold value and a magnitude of a third interference from the other micro base station to the micro terminal exceeds a predetermined third threshold value, the method may further include receiving, from the micro terminal, a message requesting a hierarchical coordinated beamforming including at least one of an identification of a micro cell receiving interference, an amount of interference of each of the second interference and the third interference, channel state information, a precoding matrix index, and a channel quality index, transmitting the hierarchical coordinated beamforming message to the macro base station, in response to the message requesting the hierarchical coordinated beamforming, receiving, from the macro base station determining a transmission beamforming vector based on the hierarchical coordinated beamforming message, a response message of the hierarchical coordinated beamforming including information about the transmission beamforming vector, a start point of the hierarchical coordinated beamforming, and a resource region for the hierarchical coordinated beamforming, and performing the hierarchical coordinated beamforming based on the response message of the hierarchical coordinated beamforming.

According to an embodiment, by performing a different interference control scheme based on various interference cases occurring among a macro base station, a micro base station, and the other micro base station in a hierarchical cellular network, interference between a macro cell and a micro cell, and between a micro cell and a micro cell may be reduced, and a transfer rate in each cell may be enhanced.

In yet another aspect, a computer-readable medium including a program for instructing a computer to perform a communication method of a macro base station for an interference control in a hierarchical cellular network including a macro base station serving at least one macro terminal, at least one micro base station serving a respective micro terminal, and at least one micro base station, the method including receiving, from the macro terminal, a message requesting a ranging expansion and including bias values requested by the macro terminal, where a magnitude of a first interference from the micro base station to the macro terminal exceeds a predetermined first threshold value, determining a bias value used for the ranging expansion, based on the message requesting the ranging expansion, and transmitting, to the macro terminal and the micro base station, a ranging expansion message including the bias value, so that the macro terminal and the micro base station may perform the ranging expansion.

In still another aspect, a communication method of controlling interference between at least one of a macro base station, a macro terminal, a micro base station, a micro terminal and at least one other micro base station in a hierarchical cellular network, the method including measuring an amount of interference between the at least one of the macro base station, the macro terminal, the micro base station, the micro terminal and the other micro base station, comparing the amount of interference with a predetermined threshold value, and depending on whether the amount of interference between the at least one of the macro base station, the macro terminal, the micro base station, the micro terminal and the other micro base station exceeds or is less than the predetermined threshold value, applying an interference control scheme to reduce interference between the at least one of the macro base station, the macro terminal, the micro base station, the micro terminal and the other micro base station.

The interference control scheme may be one of a ranging expansion, coordinated silencing, coordinated beamforming, and hierarchical coordinated beamforming interference control scheme.

A ranging expansion interference control scheme may be used when the amount of interference from the micro base station to the macro terminal exceeds a predetermined threshold.

A coordinated silencing interference control scheme may be used when the amount of interference from the macro base station to the micro terminal exceeds a predetermined threshold and the amount of interference from the other micro base station to the micro terminal exceeds a predetermined threshold.

A coordinated beamforming interference control scheme may be used when the amount of interference from the macro base station to the micro terminal is less than a predetermined threshold and the amount of interference from the other micro base station to the micro terminal exceeds a predetermined threshold.

A hierarchical coordinated beamforming interference control scheme is used when the amount of interference from the macro base station to the micro terminal exceeds a predetermined threshold and the amount of interference from the other base station to the micro terminal exceeds a predetermined threshold.

A hierarchical coordinated beamforming interference control scheme is used when the amount of interference from the macro base station to the micro terminal exceeds a predetermined threshold and the amount of interference from the micro base station to the macro terminal exceeds a predetermined threshold.

Other features and aspects may be apparent from the following detailed description, the drawings, and the claims.

BRIEF DESCRIPTION OF THE DRAWINGS

FIG. 4 is a flowchart illustrating an example of a communication method of a macro base station.

FIG. 7 is a flowchart illustrating an example of a communication method of a micro base station.

FIGS. 8A, 8B, and 8C are diagrams illustrating an example of a coordinated silencing scheme and a resource allocating scheme according to a coordinated silencing.

Figure 1:
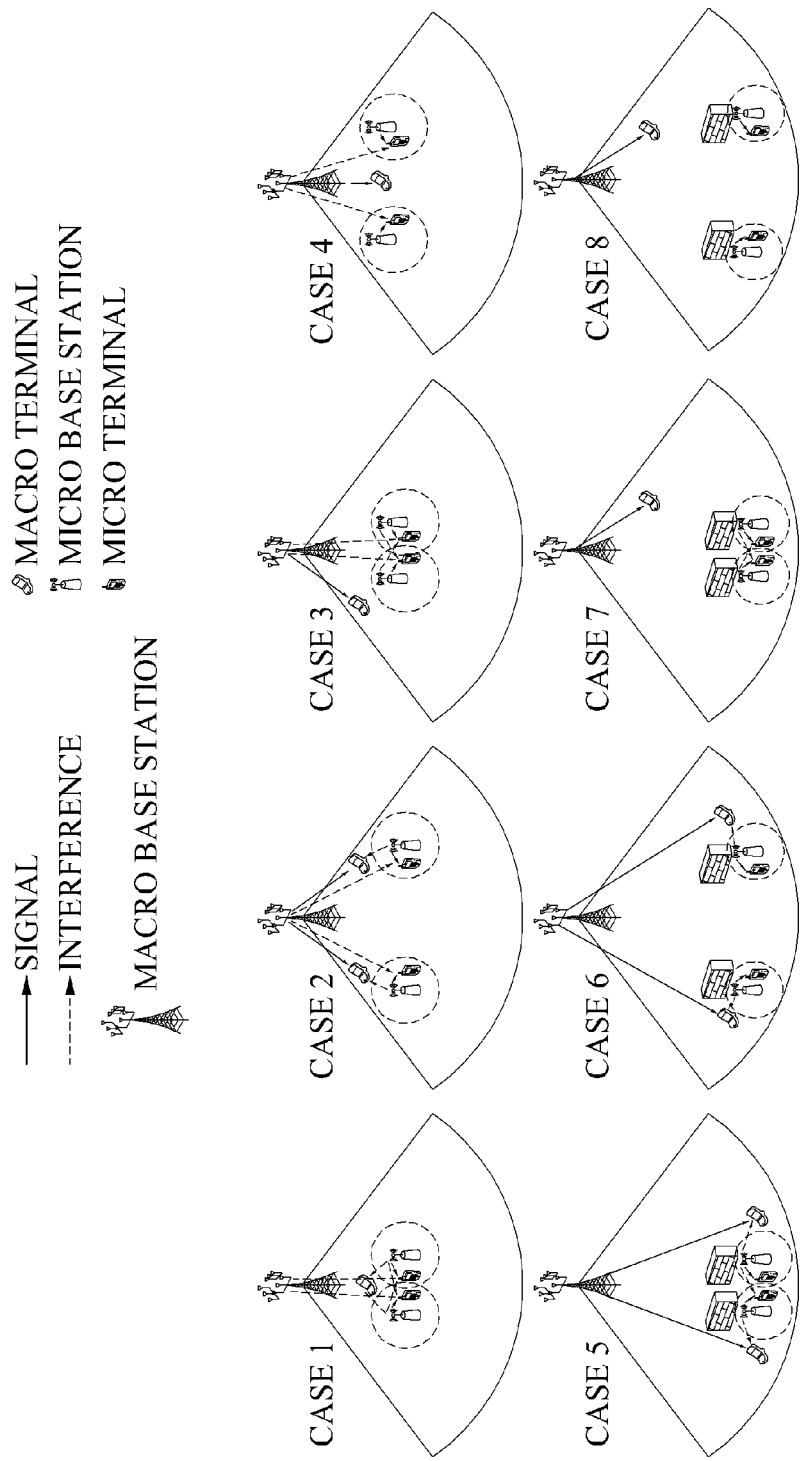
FIG. 1 is a diagram illustrating an example of various interference cases occurring among a macro base station, a micro base station, and another micro base station in a hierarchical cellular network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

A micro terminal described below may correspond to a terminal receiving a service from a micro cell, and may include a pico terminal receiving a service from a pico cell, a femto terminal, and the like.

FIG. 1 includes an example of various interference cases occurring among a macro base station, a micro base station, and the other micro base station in a hierarchical cellular network.

Referring to FIG. 1, the various interference cases may occur in the hierarchical cellular network including a macro base station serving at least one macro terminal, at least one micro base station serving a respective micro terminal, and at least one other micro base station. An interference control scheme used for the various interference cases described in FIG. 1 is summarized in the following Table 1.

TABLE 1

| | Case 1 | Case 2 | Case 3 | Case 4 | Case 5 | Case 6 | Case 7 | Case 8 |
|---|---|---|---|---|---|---|---|---|
| $I_{M \to P} >$ threshold | Yes | Yes | Yes | Yes | No | No | No | No |
| $I_{P \to M} >$ threshold | Yes | Yes | No | No | Yes | Yes | No | No |
| $I_{P \to P} >$ threshold | Yes | No | Yes | No | Yes | No | Yes | No |
| interference control scheme | RE & CS & CB RE & HCB | RE& CS HCB | HCB | CS | RE& CB | RE | CB | N/A |

Referring to Table 1, the various interference cases occurring in the hierarchical cellular network including the macro base station serving the at least one macro terminal, the micro base station serving the respective micro terminal, and the other micro base station are described below.

As described in Table 1, the various illustration of interference cases shown in FIG. 1 may be classified by a magnitude of interference $I_{M\_P}$ from the macro base station to the respective micro terminal, interference $I_{P\_M}$ from the micro base station to the macro terminal, and interference $I_{P\_P}$ from the other micro base station to the respective micro terminal. Here, a value defined as an interference-to noise ratio (INR) or a signal-to-interference-plus-noise ratio (SINR) may be used instead of an amount representing the magnitude of the interference and indicated by I.

use of the coordinated silencing CS, only the hierarchical coordinated beamforming HCB may be used instead of using the ranging expansion RE and the coordinated silencing CS.

In Case 3 through Case 7, schemes indicated in Table 1 may be used. In Case 8, a predetermined interference control scheme is not requested since an interference may not occur.

Detailed operations for each interference control scheme depending on each case will be described with reference to the following Table 2.

TABLE 2

| | RE | CS | CB | HCB |
|---|---|---|---|---|
| Working condition | $I_{P \to M}$ >threshold | $I_{M \to P}$ > threshold & $I_{P \to P}$ > threshold | $I_{M \to P}$ < threshold & $I_{P \to P}$ > threshold | $I_{M \to P}$ > threshold & $I_{P \to P}$ > threshold or $I_{M \to P}$ > threshold & $I_{P \to M}$ > threshold |
| Used algorithm | Bias-based handover | Dynamic Coordinated Silencing (DCS) | Zero-Forcing beamforming (ZF) | Hierarchical Interference Alignment (HIA) |
| Definition of message | Request RE from macro cell to micro cell | Request CS from micro cell to macro cell | Request ZF between micro cell and micro cell | Request HIA from micro cell to macro cell, and between micro cell and micro cell |
| Requested information | Bias value | Degree of silencing or number of silencing channels or SINR value of lower user | CSI (Channel State Information) or PMI (Precoding Matrix Index) and CQI (Channel Quality Index) value | CSI (Channel State Information) or PMI (Precoding Matrix Index) and CQI (Channel Quality Index) value |

Since whether an interference exists may be determined by comparing a predetermined threshold value with the interference $I_{M\_P}$, the interference $I_{P\_M}$, and the interference $I_{P\_P}$, eight cases may be considered as described in FIG. 1. Each predetermined threshold value may be set to be the same, or to be different from each other.

As an example of the interference control scheme used for the eight cases, a ranging expansion RE, a coordinated silencing CS, a coordinated beamforming CB, and a hierarchical coordinated beamforming HCB may be considered. According to an embodiment, the interference control schemes may be used as necessary depending on an interference case.

In Case 1, the ranging expansion RE, the coordinated silencing CS, and the coordinated beamforming CB may be used together, or the ranging expansion RE and the hierarchical coordinated beamforming HCB may be used together. In a case where a transfer rate of the macro cell decreases due to a use of the coordinated silencing CS, the ranging expansion RE and the hierarchical coordinated beamforming HCB may be used.

In Case 2, the ranging expansion RE and the coordinated silencing CS may be used, or the hierarchical coordinated beamforming HCB may be used. In this instance, in a case where the transfer rate of the macro cell decreases due to the As described in Table 2, a working condition, a used algorithm, a definition of a message to be transferred, and requested information may be classified based on the interference control scheme.

The working condition used when $I_{P\_M}$ exceeds a predetermined threshold may be the ranging expansion RE interference control scheme, and the used algorithm for the ranging expansion RE may adopt a terminal handover algorithm based on a bias. A definition of the message may be a message requesting the ranging expansion RE from the macro cell to the micro cell and the requested information may be a message to include a bias value. The bias value may be applied when the micro cell determines a handover condition of a terminal.

The working condition used when $I_{M\_P}$ exceeds a predetermined threshold and $I_{P\_P}$ exceeds a predetermined threshold may be the coordinated silencing CS interference control scheme. As an algorithm used in this case, the dynamic coordinated silencing DCS may be given as an example. The definition of the message may be a request from the micro cell to the macro cell for the dynamic coordinated silencing DCS. In this instance, requested information may be about the degree of the silencing or the number of silencing channels. The working condition used when $I_{M\_P}$ is less than a predetermined threshold and $I_{P\_P}$ exceeds a predetermined threshold may be the coordinated beamforming CB interference control scheme. As an algorithm used in this case, the zero-forcing beamforming ZF may be given as an example. To resolve a problem of the interference between the micro cells, the definition of the message may be that the ZF is requested between the micro cells. In this instance, the requested information may be that channel state information CSI or the precoding matrix index PMI and a channel quality index CQI value is used for the ZF to be exchanged between the micro cells.

The working condition used when $I_{M\_P}$ exceeds a predetermined threshold and $I_{P\_P}$ exceeds a predetermined threshold, or when $I_{M\_P}$ exceeds a predetermined threshold and $I_{P\_M}$ exceeds a predetermined threshold may be the hierarchical coordinated beamforming HCB. As an algorithm used in this case, the hierarchical interference alignment HIA may be given as an example. To implement the HIA, the definition of the message may be that the HIA is requested from the micro cell to the macro cell, and an appointment for using the HIA between the micro cells. To use the HIA, the requested information may be for the micro cell and the macro cell to share the CSI, PMI, and CQI value, and the like.

Figure 2:
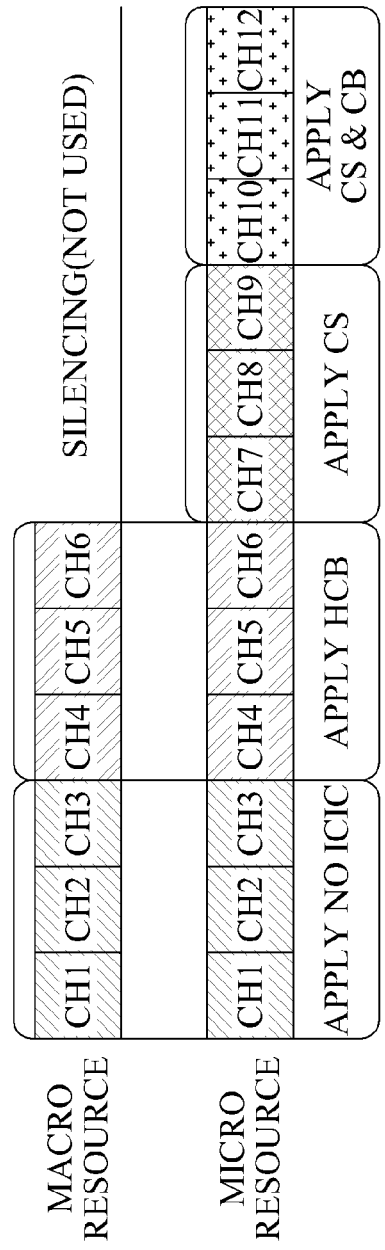
FIG. 2 is a diagram illustrating an example of a resource management scheme of a macro cell and a micro cell according to an interference control scheme applied to the various interference cases of FIG. 1.

FIG. 2 includes an example of a resource management scheme of a macro cell and a micro cell according to an interference control scheme applied to the various interference cases of FIG. 1.

Referring to FIG. 2, a management scheme of used resources and a framework based on the interference control scheme are described.

A used macro resource of a macro cell and a used micro resource of a micro cell may be simultaneously managed. When the macro cell performs a silencing so as to prevent to interference with the micro cell, the macro cell may not use a resource of the macro cell. A region using resources may include a portion not controlling interference, that is, No ICIC, and a region using the interference control scheme of a hierarchical coordinated beamforming HCB type.

In a silencing region where resources are not used, only the micro cell may use a corresponding resource. For the micro cell, resources may be classified into a portion where only a coordinated silencing CS is used and a region where the coordinated silencing CS and a coordinated beamforming CB are simultaneously used. In a structure of a resource management framework, an amount of resources applied based on each corresponding interference control scheme may change depending on a situation, which will be described with reference to FIG. 8.

Figure 3A:
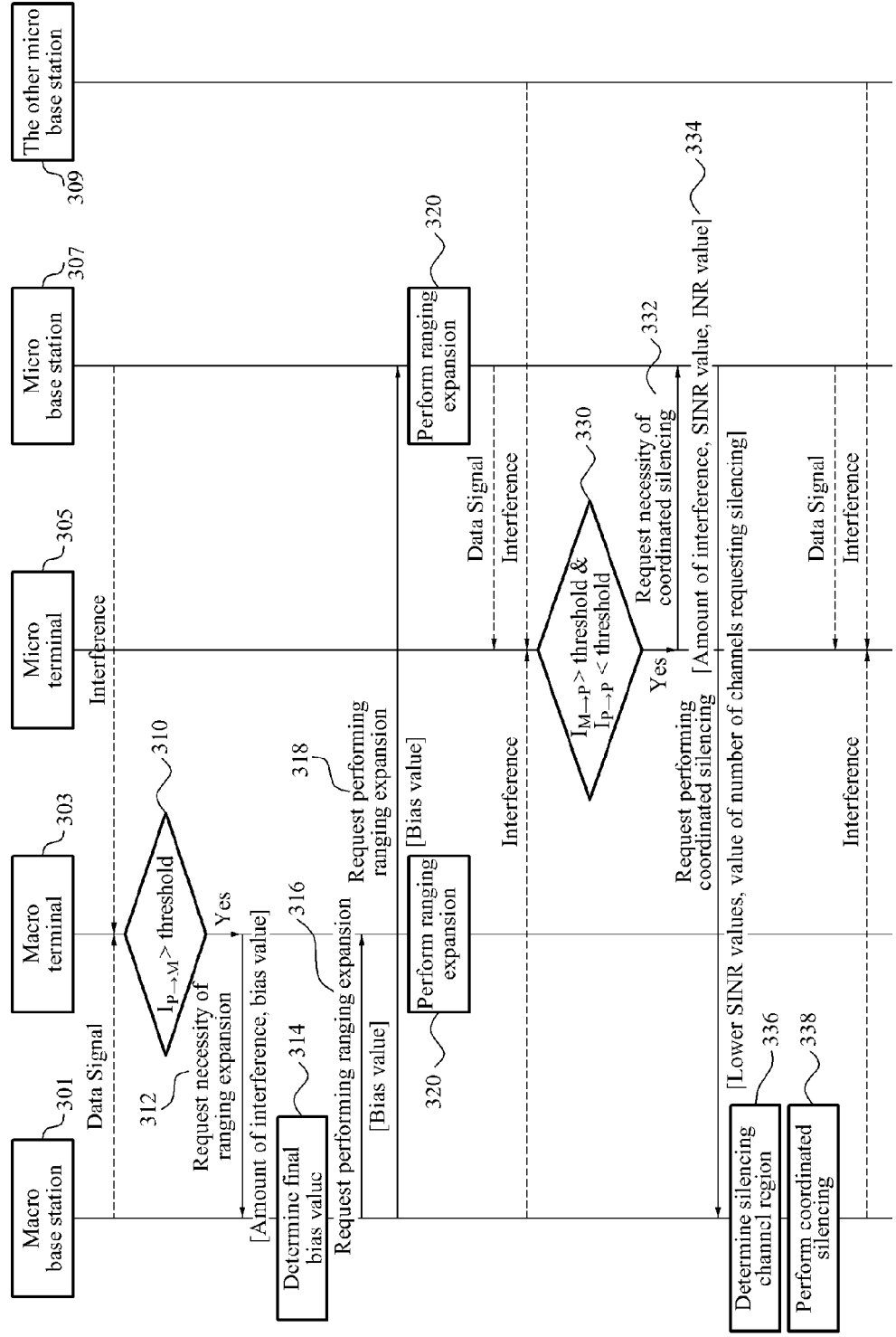
FIGS. 3A and 3B are diagrams illustrating an example of a communication method of a macro base station, a macro terminal, a micro base station, and a micro terminal in a hierarchical cellular network.
Figure 3B:
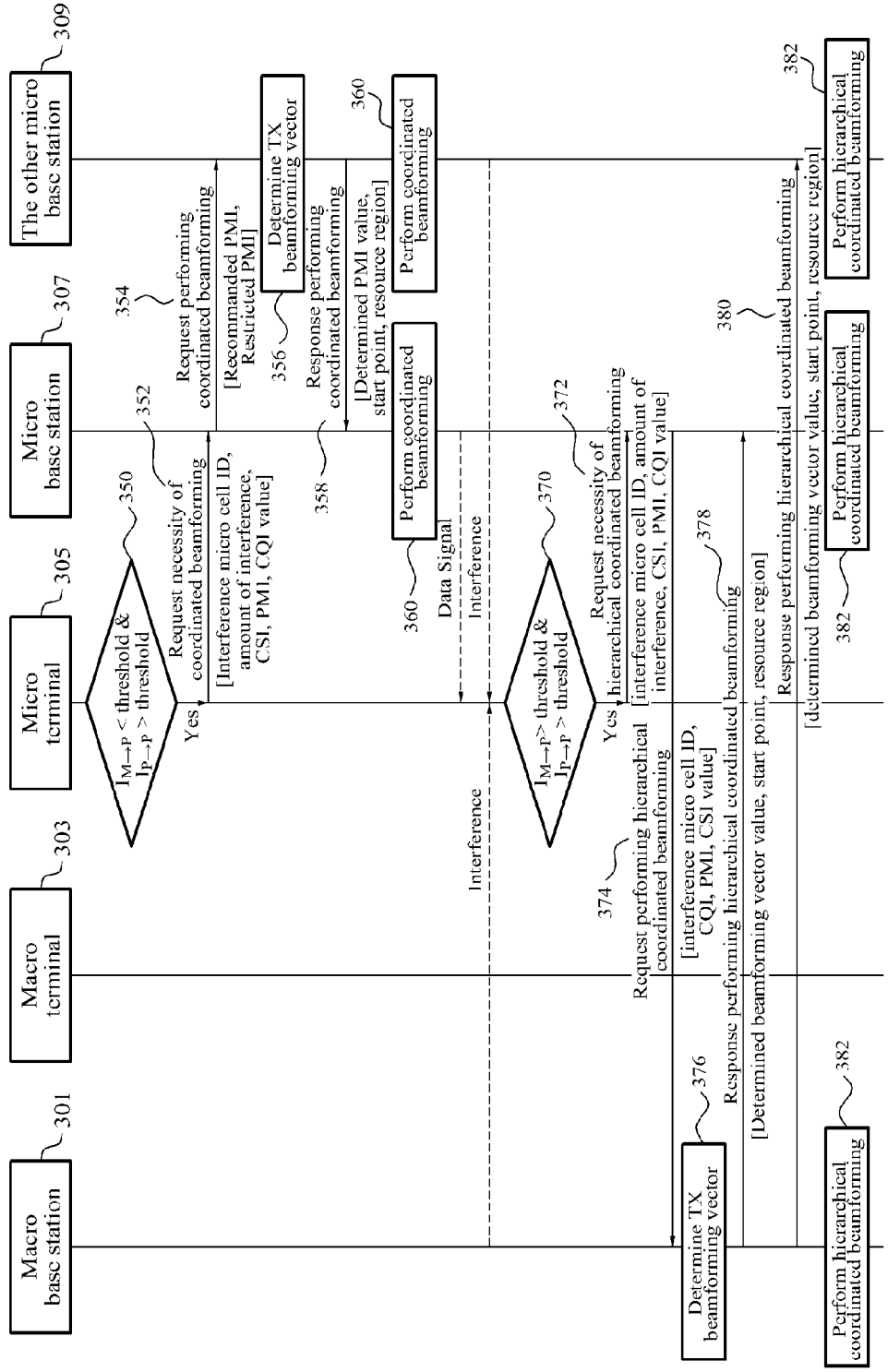

FIGS. 3A and 3B include an example of a communication method of a macro base station 301, a macro terminal 303, a micro base station 307, and a micro terminal 305 in a hierarchical cellular network.

Referring to FIGS. 3A and 3B, the hierarchical cellular network according to an embodiment may include the macro base station 301, the macro terminal 303, the micro terminal 305, the micro base station 307, and the other micro base station 309.

An overall interference control operation in the hierarchical cellular network is described below.

As shown in FIG. 3A, in operation 310 through operation 320, when a magnitude of interference $I_{P\_M}$ from the micro base station 307 to the macro terminal 303 exceeds a predetermined first threshold value, each of the macro terminal 303 and the micro base station 307 may perform a ranging expansion RE between a macro cell and a micro cell.

Thereafter, an appropriate interference control scheme may be performed based on a magnitude of interference $I_{M\_P}$ from the macro base station 301 to the micro terminal 305, and a magnitude of interference $I_{P\_P}$ from the other micro base station 309 to the micro terminal 305.

In operation 330 through operation 338, when a magnitude of interference $I_{M\_P}$ from the macro base station 301 to the micro terminal 305 exceeds a predetermined second threshold value, and a magnitude of interference $I_{P\_P}$ from the other micro base station 309 to the micro terminal 305 is less than a predetermined third threshold value, the macro base station 301 may perform a coordinated silencing CS between the macro cell and the micro cell.

As shown in FIG. 3B, in operation 350 through operation 360, when a magnitude of interference $I_{M\_P}$ from the macro base station 301 to the micro terminal 305 is less than the predetermined second threshold value, and the magnitude of interference $I_{P\_P}$ from the other micro base station 309 to the micro terminal 305 exceeds the predetermined third threshold value, the micro base station 307 and the other micro base station 309 may perform a coordinated beamforming CB between the micro cell and the micro cell.

In operation 370 through operation 382, when a magnitude of interference $I_{M\_P}$ from the macro base station 301 to the micro terminal 305 exceeds the predetermined second threshold value, and the magnitude of interference $I_{P\_P}$ from the other micro base station 309 to the micro terminal 305 exceeds the predetermined third threshold value, each of the macro base station 301, the micro base station 307, and the other micro base station 309 may perform a hierarchical coordinated beamforming HCB between the macro cell and the micro cell, and between the micro cell and the micro cell.

Hereinafter, an operational flow for an overall interference control, and a message associated with an operation for an interference control will be described.

Operational Flow of Ranging Expansion RE

As shown in FIG. 3A, when the macro terminal 303 receives interference $I_{P\_M}$ from a neighboring micro base station 307 and an amount of interference $I_{P\_M}$ exceeds a predetermined threshold value in operation 310, the macro terminal 303 may perform a ranging expansion RE and may transmit a message requesting the ranging expansion RE to a base station of the macro terminal 303, that is, the macro base station 301 in operation 312. In this instance, the message requesting the ranging expansion RE may include an amount of interference the macro terminal 303 currently receives from the neighboring micro base station 307, or a bias value requested by the macro terminal 303 during the ranging expansion RE.

In operation 314, the macro base station 301 may receive a message requesting the ranging expansion from several macro terminals including the macro terminal 303, and may determine a final bias value by synthesizing received messages requesting the ranging expansion RE.

In operation 316 and operation 318, the macro base station 301 may send the message requesting the ranging expansion RE and including the determined final bias value, for example, a ranging expansion message to each of macro terminals and corresponding micro base stations in a cell so that each of the macro terminals and the corresponding micro base stations may recognize the final bias value.

In operation 320, the macro terminals including the macro terminal 303 and the micro base station 307 may perform the ranging expansion RE based on the final bias value, that is, the bias value included in the message requesting performing of the ranging expansion RE.

Operational Flow of Coordinated Silencing CS

The micro terminal 305 may adopt three interference control schemes determined by comparing the magnitude of each of interference $I_{M\_P}$ received from the macro base station 301 and the magnitude of interference $I_{P\_P}$ from the other micro base station 309 with a predetermined threshold value.

First, as shown in FIG. 3A, when a magnitude of interference $I_{M\_P}$ from the macro base station 301 to the micro terminal 305 exceeds a predetermined second threshold, and a magnitude of interference $I_{P\_P}$ from the other micro base station 309 to the micro terminal 305 is less than a predetermined third threshold, the macro base station 301 may perform the coordinated silencing CS between the macro cell and the micro cell.

In response to a recognition of the first interference case in operation 330, the micro terminal 305 may transmit a message requesting the coordinated silencing CS to the micro base station 307 of the micro terminal 305 in operation 332.

The message requesting the coordinated silencing CS may include information associated with a communication quality such as an amount of received interference, an SINR value, an INR value, and the like of the micro terminal 305. In operation 334, the micro base station 307 receiving the message requesting the coordinated silencing CS from the micro terminal 305 may transfer, to the macro base station 301 corresponding to a higher order base station, the message requesting performing of the coordinated silencing CS, for example, a coordinated silencing message.

The message requesting the performing of the coordinated silencing CS may include a lower SINR value used for determining a silencing channel region by the macro base station 301, a number of silencing channels requested by the micro base station 307, and the like.

The macro base station 301 receiving the message requesting the performing of the coordinated silencing CS may determine the silencing channel region in operation 336, and may perform the coordinated silencing CS in operation 338.

Second, as shown in FIG. 3B, when a magnitude of interference $I_{M\_P}$ from the macro base station 301 to the micro terminal 305 is less than the predetermined second threshold, and the magnitude of interference $I_{P\_P}$ from the other micro base station 309 to the micro terminal 305 exceeds the predetermined third threshold, each of the micro base station 307 and the other micro base station 309 may perform the coordinated beamforming CB.

In response to a recognition of the second interference case in operation 350, the micro terminal 305 may transmit a message requesting the coordinated beamforming CB to the micro base station 307 of the micro terminal 305 in operation 352.

The message requesting the coordinated beamforming CB may include an identification of a neighboring micro cell, an amount of interference from the neighboring micro cell, CSI, or a PMI and a CQI value, and the like.

In operation 354, the micro base station 307 receiving the message requesting the coordinated beamforming CB may transmit, to neighboring the other base station 309 interfering with the micro base station 307, a message requesting the performing of the coordinated beamforming CB, for example, a coordinated beamforming message.

The message requesting the performing of the coordinated beamforming CB may include a PMI set preferably used by the other base station 309, that is, a recommended PMI and a PMI set preferably not used by the other base station 309.

In operation 356, the other base station 309 receiving the message requesting the performing of the coordinated beamforming CB may determine a transmission beamforming vector, that is, a TX beamforming vector in the PMI set to be used.

In operation 358, the other base station 309 may respond by a coordinated beamforming performing response message. The coordinated beamforming performing response message may include a determined PMI value, that is, a TX beamforming vector value, and may include a description about a resource region and a point in time when the coordinated beamforming starts together.

In operation 360, the micro base station 307 receiving the coordinated beamforming performing response message may perform the coordinated beamforming between micro cells with a predetermined resource region and at a point in time predetermined by the micro base station 307 and the other base station 309 interfering with each other.

Third, as shown in FIG. 3B, when a magnitude of interference $I_{M\_P}$ from the macro base station 301 to the micro terminal 305 exceeds the predetermined second threshold, and the magnitude of interference $I_{P\_P}$ from the other micro base station 309 to the micro terminal 305 exceeds the predetermined third threshold, the macro base station 301, the micro base station 307, and the other micro base station 309 may perform a hierarchical coordinated beamforming HCB between the macro cell and the micro cell, and between the micro cell and the micro cell.

In response to a recognition of the third interference case in operation 370, the micro terminal 305 may transmit a message requesting the hierarchical coordinated beamforming HCB to the micro base station 307 of the micro terminal 305 in operation 372.

The message requesting the hierarchical coordinated beamforming HCB may include at least one of identifications of interfering micro cells, an amount of interference received from each of the other micro base station 309 and the macro base station 301 corresponding to an interference source, the CSI, the PMI, and the CQI.

In operation 374, the micro base station 307 receiving the message requesting the hierarchical coordinated beamforming HCB may forward the information to the macro base station 301 corresponding to a higher order base station, and may transmit a message requesting the performing of the hierarchical coordinated beamforming HCB.

The message requesting the performing of the hierarchical coordinated beamforming HCB may include at least one of identifications of interfering micro cells, the CSI received from the other micro base station 309 and the macro base station 301 corresponding to an interference source, the PMI, and the CQI.

In operation 376, the macro base station 301 may determine the transmission beamforming vector, that is, the TX beamforming vector for performing the hierarchical coordinated beamforming with messages requesting the hierarchical coordinated beamforming HCB collected from micro base stations including the micro base station 307.

In operation 378 and operation 380, the macro base station 301 may transmit, to corresponding micro base stations, the coordinated beamforming performing response message including a description about a determined value of the transmission beamforming vector, the start point of the hierarchical coordinated beamforming HCB, and the resource region.

In operation 382, the macro base station 301, the micro base station 307, and the other micro base station 309 may perform the hierarchical coordinated beamforming HCB using the above determined value of the transmission beamforming vector, the start point of the hierarchical coordinated beamforming HCB, and the resource region.

FIG. 4 includes an example of a communication method of a macro base station.

Referring to FIG. 4, in operation 405, when a magnitude of a first interference from a micro base station to a macro terminal exceeds a predetermined first threshold value, the macro base station may receive a message requesting a ranging expansion and including bias values requested by the macro terminal.

The macro base station may determine a bias value used for the ranging expansion, based on the message requesting the ranging expansion in operation 410, and may transmit, to the macro terminal and the micro base station, a ranging expansion message including the bias value, so that the macro terminal and the micro base station may perform the ranging expansion in operation 415.

In operation 420, when a magnitude of a second interference from the macro base station to the micro terminal exceeds a predetermined second threshold value and a magnitude of a third interference from the other micro base station to the micro terminal is less than a predetermined third threshold value, the micro base station may receive a coordinated silencing message with respect to the macro base station from the micro base station receiving, from the micro terminal, a message requesting a coordinated silencing.

In this instance, the message requesting the coordinated silencing may include information about an amount of interference, that is, a magnitude of interference of each of the second interference and the third interference and a communication quality of the micro terminal.

The coordinated silencing message may include at least one of information about a communication quality of each of the micro terminal and the micro base station, and a number of channels requesting the coordinated silencing. The information about a communication quality of each of the micro terminal and the micro base station may include an SINR value received from each of the micro terminal and the micro base station.

The macro base station may determine a silencing channel region of the macro base station based on the message requesting the coordinated silencing in operation 425, and may perform the coordinated silencing with respect to the silencing channel region in operation 430.

Operation 425 of determining the silencing channel region of the macro base station may further include dynamically varying the silencing channel region based on a load of a macro cell including the macro base station, the bias value, a transfer rate of the micro terminal, and a transfer rate of the macro terminal. A scheme of dynamically varying the silencing channel region will be described with reference to FIGS. 8A, 8B, and 8C.

In operation 435, when a magnitude of a second interference from the macro base station to the micro terminal exceeds a predetermined second threshold value and a magnitude of a third interference from the other micro base station to the micro terminal exceeds a predetermined third threshold value, the macro base station may receive a message requesting a hierarchical coordinated beamforming with respect to the macro base station from the micro base station receiving, from the micro terminal, a message informing that the hierarchical coordinated beamforming is requested.

The message requesting the hierarchical coordinated beamforming may include at least one of an identification of a micro cell interfering with at least one micro terminal, a CQI of the micro base station, a PMI of the micro base station, and CSI of the micro base station.

In operation 440, the macro base station may determine a value of a transmission beamforming vector used for the hierarchical coordinated beamforming based on the message requesting the hierarchical coordinated beamforming.

In operation 445, the macro base station may transmit, to each of the micro base station and the other micro base station, a hierarchical coordinated beamforming message including information about at least one of the value of the transmission beamforming vector, a start point of the hierarchical coordinated beamforming, and a resource region of the hierarchical coordinated beamforming.

In operation 450, the macro base station may perform the hierarchical coordinated beamforming with the micro base station and the other micro base station, based on the information about the at least one of the value of the transmission beamforming vector, the start point of the hierarchical coordinated beamforming, and the resource region of the hierarchical coordinated beamforming.

Figure 5:
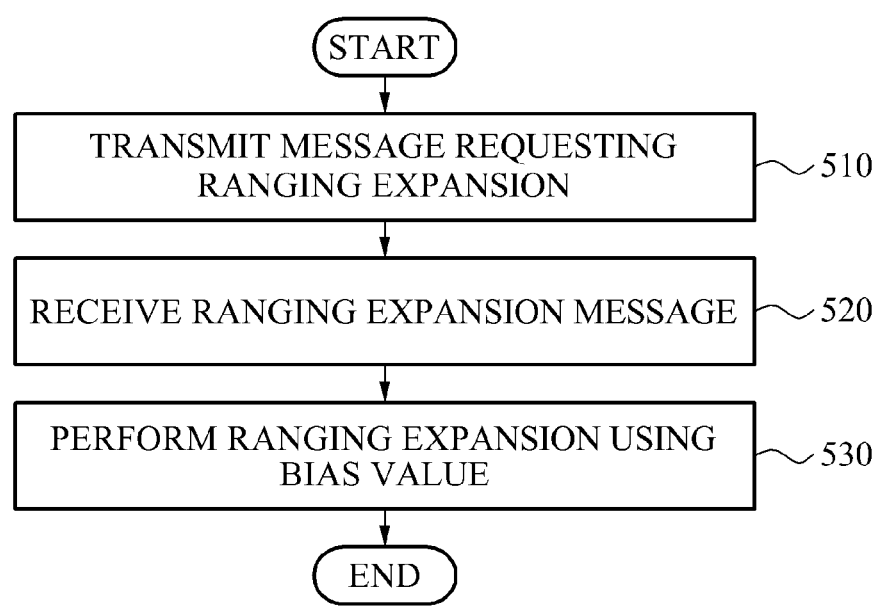
FIG. 5 is a flowchart illustrating an example of a communication method of a macro terminal.

FIG. 5 includes an example of a communication method of a macro terminal.

Referring to FIG. 5, in operation 510, the macro terminal may transmit, to the macro base station, a message requesting a ranging expansion, where a magnitude of a first interference from the micro base station to the macro terminal exceeds a predetermined first threshold value. The macro terminal may receive, from the macro base station, a ranging expansion message including a bias value determined based on the message requesting the ranging expansion in operation 520, and may perform the ranging expansion using the bias value in operation 530.

The message requesting the ranging expansion may include at least one of an amount of interference of the first interference, and a bias value requested by the macro terminal during the ranging expansion.

Figure 6:
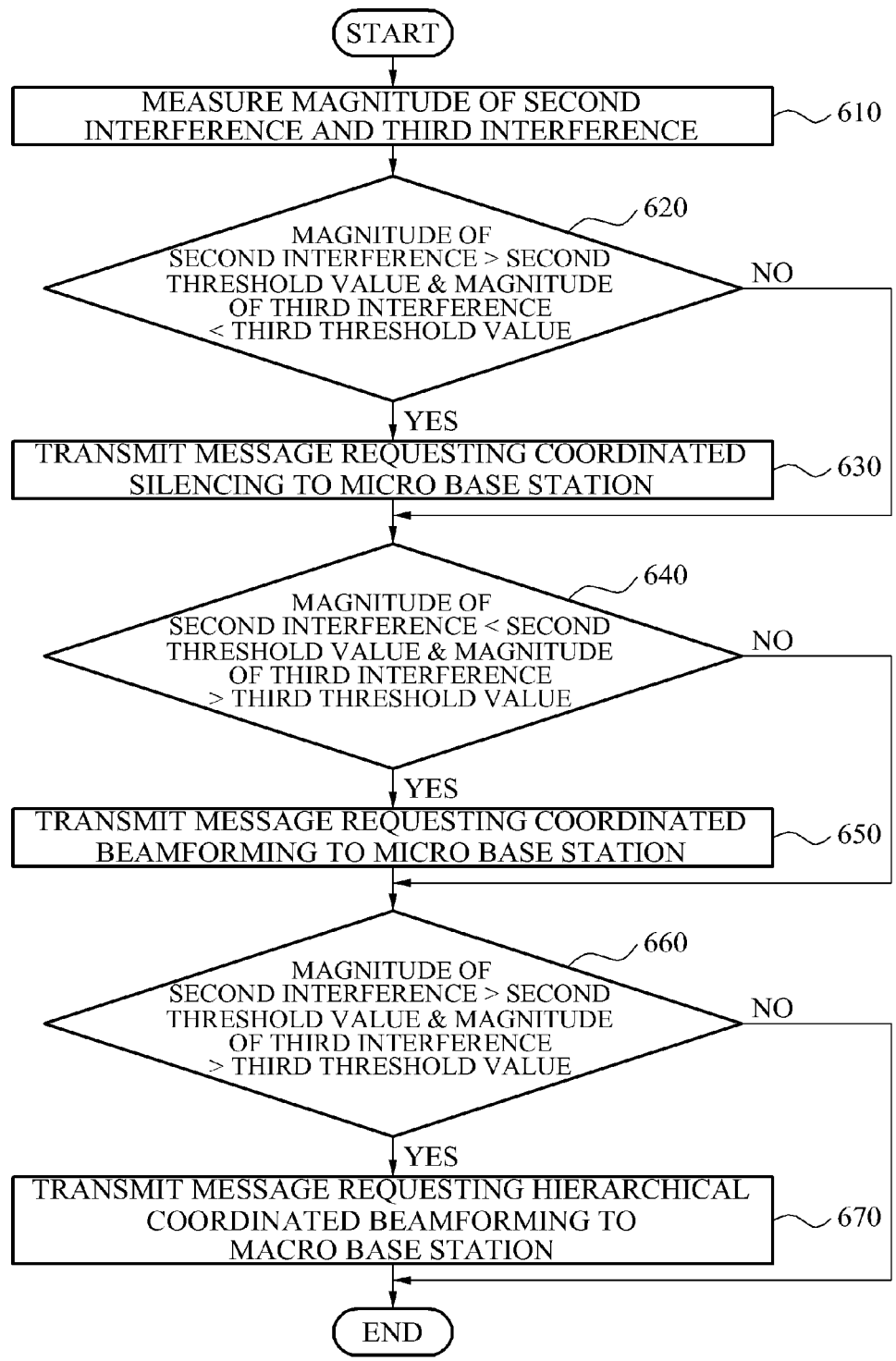
FIG. 6 is a flowchart illustrating an example of a communication method of a micro terminal.

FIG. 6 includes an example of a communication method of a micro terminal.

Referring to FIG. 6, in operation 610, the micro terminal may measure a magnitude of a second interference from the macro base station to the micro terminal, and a third interference from the other micro base station to the micro terminal.

The micro terminal may transmit, to the micro base station, a message for controlling the second interference and the third interference based on the magnitude of the second interference and the magnitude of the third interference.

In particular, when a magnitude of the second interference exceeds a predetermined second threshold value and a magnitude of the third interference is less than a predetermined third threshold value in operation 620, the micro terminal may transmit, to the micro base station, a message requesting a coordinated silencing including information about at least one of an amount of interference of each of the second interference and the third interference, and a communication quality of each of the micro terminal and the micro base station, so as to request a performance of the coordinated silencing with respect to the macro base station in operation 630.

When the condition of operation 620 is not satisfied, the micro terminal may determine whether a condition of operation 640 is satisfied.

When a magnitude of the second interference is less than a predetermined second threshold value and a magnitude of the third interference exceeds a predetermined third threshold value in operation 640, the micro terminal may transmit, to the micro base station, a message requesting a coordinated beamforming, so as to request the other micro base station for a performance of the coordinated beamforming in operation 650. When the condition of operation 640 is not satisfied, the micro terminal may determine whether a condition of operation 660 is satisfied.

The message requesting the coordinated beamforming may include at least one of an identification of a micro cell receiving the interference, an amount of interference received from a neighboring micro cell, CSI, a PMI, and a CQI.

When a magnitude of the second interference exceeds a predetermined second threshold value and a magnitude of the third interference exceeds a predetermined third threshold value in operation 660, the micro terminal may transmit, to the macro base station, a message requesting a hierarchical coordinated beamforming in operation 670.

The message requesting the hierarchical coordinated beamforming may include at least one of an identification of a micro cell receiving the interference from the micro base station, an amount of interference of each of the second interference and the third interference, the CSI, the PMI, and the CQI.

FIG. 7 includes an example of a communication method of a micro base station.

Referring to FIG. 7, in operation 705, for an interference control scheme in a hierarchical cellular network including a macro base station serving at least one macro terminal, at least one micro base station serving a respective micro terminal, and at least one other micro base station, the micro base station may receive a ranging expansion message from the macro base station receiving a message requesting a ranging expansion from the macro terminal, where a magnitude of a first interference from the micro base station to the macro terminal exceeds a predetermined first threshold value.

In operation 710, the micro base station may perform the ranging expansion using a bias value to be used for the ranging expansion and is included in the ranging expansion message.

In operation 715, the micro base station may receive a message requesting a coordinated silencing from the micro terminal.

In this case, when a magnitude of a second interference from the macro base station to the micro terminal exceeds a predetermined second threshold value and a magnitude of a third interference from the other micro base station to the micro terminal is less than a predetermined third threshold value, the message requesting the coordinated silencing may be received from the micro terminal.

The message requesting the coordinated silencing may include information about at least one of an amount of interference of each of the second interference and the third interference, and a communication quality of each of the micro terminal and the micro base station.

In operation 720, the micro base station may transmit the coordinated silencing message to the macro base station, in response to the message requesting the coordinated silencing, for the macro base station to perform the coordinated silencing. The coordinated silencing message may include at least one of information about a communication quality of the micro terminal, and a number of channels requesting the coordinated silencing.

In operation 725, the micro base station may receive, from the micro terminal, a message requesting a coordinated beamforming between the micro base station and the other micro base station.

The message requesting the coordinated beamforming may be received from the micro terminal, when a magnitude of a second interference from the macro base station to the micro terminal is less than a predetermined second threshold value and a magnitude of a third interference from the other micro base station to the micro terminal exceeds a predetermined third threshold value.

In operation 730, the micro base station may transmit, to the other micro base station, a coordinated beamforming message including at least one of a precoding matrix index PMI recommended for the coordinated beamforming and a restricted precoding matrix index PMI, according to the message requesting the coordinated beamforming.

The micro base station may receive a response message of the coordinated beamforming from the other micro base station determining a transmission beamforming vector to perform the coordinated beamforming in operation 735, and may perform the coordinated beamforming based on the response message of the coordinated beamforming in operation 740.

In operation 745, the micro base station may receive, from the micro terminal, a message requesting a hierarchical coordinated beamforming.

The message requesting the hierarchical coordinated beamforming may be received from the micro terminal, when a magnitude of a second interference from the macro base station to the micro terminal exceeds a predetermined second threshold value and a magnitude of a third interference from the other micro base station to the micro terminal exceeds a predetermined third threshold value.

The message requesting the hierarchical coordinated beamforming may include at least one of an identification of a micro cell receiving interference, an amount of interference of each of the second interference and the third interference, CSI, a PMI, and a CQI.

In operation 750, the micro base station may transmit the hierarchical coordinated beamforming message to the macro base station, in response to the message requesting the hierarchical coordinated beamforming.

In operation 755, the micro base station may receive, from the macro base station determining a transmission beamforming vector based on the hierarchical coordinated beamforming message, a response message of the hierarchical coordinated beamforming including information about the transmission beamforming vector, a start point of the hierarchical coordinated beamforming, and a resource region for the hierarchical coordinated beamforming.

In operation 760, the micro base station may perform the hierarchical coordinated beamforming based on the response message of the hierarchical coordinated beamforming.

Figure 8B:
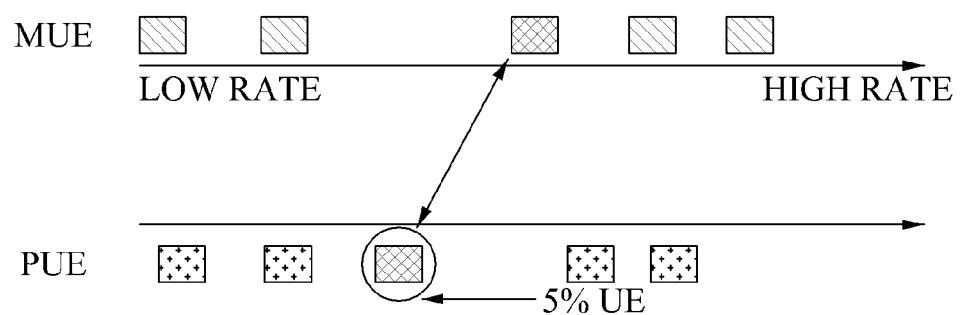
Figure 8C:
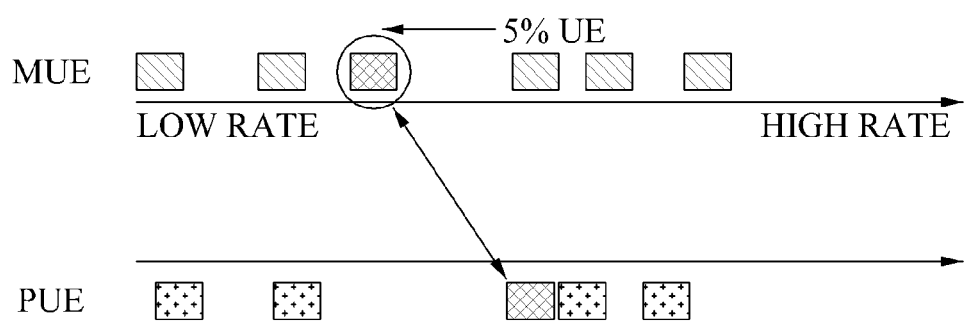

FIG. 8A includes an example of a dynamic coordinated silencing DCS scheme, and FIGS. 8B and 8C include an example of a resource allocating scheme according to a DCS.

Referring to FIG. 8A, a concept of the DCS is described.

As described above with reference to FIG. 2, a macro cell may not use a resource of the macro cell in a coordinated silencing CS and thus, a micro cell may not be interfered with in a corresponding resource region. In this instance, the macro cell may dynamically vary a silencing channel region, that is, a silencing frequency resource region based on a load of the macro cell including the macro base station, a bias value, a transfer rate of a micro terminal, and a transfer rate of the macro terminal. As shown in FIG. 8A, the macro cell in the silencing channel region may vary between SB1, SB2, SB3, SB4, SB5 having a load of ⅝W, ⅝P and a 0 dB bias value and macro cell SB1, SB2 having a load of ¼W, ¼P and a 20 dB bias value. For example, in a coordinated silencing for macro cell SB1, SB2, SB3, SB4, SB5, micro cell SB6, SB7, SB8 in the corresponding resource region may not be interfered with. In a coordinated silencing for macro cell SB1, SB2, SB3, SB4, micro cell SB5, SB6, SB7, SB8 in the corresponding resource region may not be interfered with. In a coordinated silencing for macro cell SB1, SB2, SB3, micro cell SB4, SB5, SB6, SB7, SB8 in the corresponding resource region may not be interfered with. In a coordinated silencing for macro cell SB1, SB2, micro cell SB3, SB4, SB5, SB6, SB7, SB8 in the corresponding resource region may not be interfered with.

The macro base station may dynamically control a silencing section to enhance a throughput of the overall hierarchical cellular network and to protect a transfer rate of a lower order micro terminal. A protocol between the macro base station and the other neighboring micro base station for dynamically controlling the silencing section is described below.

First, the macro base station may inform the neighboring micro base station of a number of bottom users to be reported to the neighboring micro base station. The number of bottom users may vary depending on a number of users of the overall system and a number of micro base stations.

Secondly, each micro base station included in the hierarchical cellular network may inform the macro base station of information of the corresponding bottom users.

Next, the macro base station may collect all of the reported terminals, and sort the reported terminals for each macro terminal and micro terminal.

For example, in a case of protecting bottom 5% users, the following two cases as described in FIGS. 8B and 8C, may be considered based on a type of sorted bottom 5% users. MUE denotes macro user equipment, that is, the bottom 5% macro terminals. PUE denotes pico (micro) user equipment, that is, the bottom 5% pico (micro) terminals.

FIG. 8B describes a case where the type of the bottom 5% terminals corresponds to a micro terminal type. In this instance, a scheme of controlling the silencing section is described below.

It may be assumed that a transfer rate of bottom 5% of micro terminals is referred to as a low rate (LR), and a transfer rate of a macro terminal having the lowest transfer rate among macro terminals having a transfer rate greater than or equal to the LR is referred to as a reference rate (RR).

In this instance, as the silencing section increases, the LR may be higher and the RR may be lower. Thus, the macro base station may increase the silencing section until values of the LR and the RR are as close as possible.

FIG. 8C describes a case where the type of the bottom 5% of macro terminals corresponds to a macro terminal type. In this instance, a scheme of controlling the silencing section is described below.

It may be assumed that a transfer rate of bottom 5% terminals is referred to as the LR, and a transfer rate of a micro terminal having the lowest transfer rate among micro terminals having a transfer rate greater than or equal to the LR is referred to as the RR.

In this instance, as the silencing section decreases, the LR may be higher and the RR may be lower. Thus, the macro base station may decrease the silencing section until values of the LR and the RR are as close as possible.

In FIG. 8B and FIG. 8C, each micro base station may periodically report bottom terminals to the macro base station, enabling the macro base station to dynamically control the silencing section at predetermined intervals.

Figure 9:
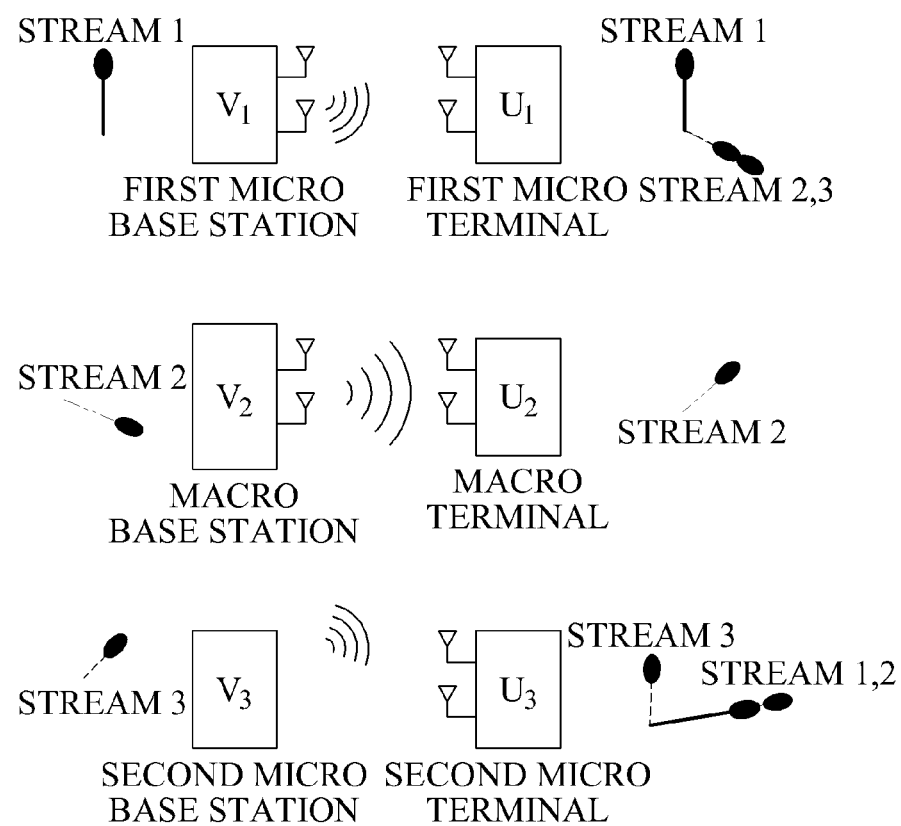
FIG. 9 is a diagram illustrating an example of a hierarchical coordinated beamforming.

FIG. 9 includes an example of a hierarchical coordinated beamforming HCB.

Referring to FIG. 9, as an example of the hierarchical coordinated beamforming HCB, an operation of a hierarchical interference alignment HIA is described.

In the hierarchical coordinated beamforming HCB, a transmission and reception beamforming vector aligning two interferences from a macro cell and a micro cell may be determined, and the macro cell and the micro cell may transmit data using a determined beamforming vector.

At a reception end, interference components may be aligned in a single domain and thus, only signals used for the reception end may be received and the rest of interference signals may be eliminated. In this instance, since the micro cell does not interfere with a macro terminal, the macro terminal may receive data only of its own the macro terminal.

Stream 1 corresponding to a signal from a micro base station 1 ($V_1$) to a micro terminal 1 ($U_1$) at a reception end may become Stream 1+Stream 2/3 due to interference from a macro base station ($V_2$) and a micro base station 2 ($V_3$). Stream 3 corresponding to a signal from the micro base station 2 ($V_3$) to a micro terminal 2 ($U_3$) at a reception end may become Stream 3+Stream 1/2 due to interference from the macro base station ($V_2$) and the micro base station 1 ($V_1$).

The hierarchical coordinated beamforming HCB may determine the transmission and reception beamforming vector aligning two interferences from the macro cell and the micro cell by the above transmitted and received signal, and the macro cell and the micro cell may transmit data using a determined beamforming vector.

In this instance, since the micro cell does not interfere with a macro terminal ($U_2$), the macro terminal ($U_2$) may receive only Stream 2 corresponding to a signal only of its own the macro terminal ($U_2$) received from the macro base station ($V_2$).

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method executed by a macro base station for controlling interference in a hierarchical cellular network that includes the macro base station serving a macro terminal, a micro base station serving a micro terminal, and another micro base station, the method comprising:
   receiving, from the macro terminal, a message requesting a ranging expansion and including prospective bias values desired by the macro terminal, in response a magnitude of first interference from the micro base station to the macro terminal exceeding a predetermined first threshold value;
   determining a bias value used for the ranging expansion, based on the message requesting the ranging expansion;
   transmitting, to the macro terminal and the micro base station, a ranging expansion message including the determined bias value, so that the macro terminal and the micro base station perform the ranging expansion; and
   determining, based on a message requested by the micro base station, whether to perform a first combination of a hierarchical coordinated beamforming, a coordinated silencing, and the ranging expansion, or a second combination of the ranging expansion and the hierarchical coordinated beamforming.

2. The method of claim 1, wherein, in response to a magnitude of second interference from the macro base station to the micro terminal exceeding a predetermined second threshold value and a magnitude of third interference from the other micro base station to the micro terminal being less than a predetermined third threshold value, the performing comprises:
   receiving, from the micro base station, a message requesting a coordinated silencing, the coordinated silencing request message including information about an amount of interference of each of the second interference and the third interference and a communication quality of the micro terminal;
   determining a silencing channel region of the macro base station based on the message requesting the coordinated silencing; and
   performing the coordinated silencing with respect to the silencing channel region.

3. The method of claim 2, wherein the coordinated silencing message includes information about a communication quality of each of the micro terminal and the micro base station or a number of channels requesting the coordinated silencing.

4. The method of claim 2, further comprising dynamically varying the silencing channel region based on a load of a macro cell in which the macro base station participates, the bias value, a transfer rate of the micro terminal, and a transfer rate of the macro terminal.

5. The method of claim 1, wherein, in response to a magnitude of second interference from the macro base station to the micro terminal exceeding a predetermined second threshold value and a magnitude of third interference from the other micro base station to the micro terminal exceeding a predetermined third threshold value, the performing comprises:
   receiving a message requesting the hierarchical coordinated beamforming from the micro base station;
   determining a value of a transmission beamforming vector used for the hierarchical coordinated beamforming based on the message requesting the hierarchical coordinated beamforming;
   transmitting, to each of the micro base station and the other micro base station, a hierarchical coordinated beamforming message including information about the value of the transmission beamforming vector, a start point of the hierarchical coordinated beamforming, or a resource region of the hierarchical coordinated beamforming; and
   performing the hierarchical coordinated beamforming based on the information about the value of the transmission beamforming vector, the start point of the hierarchical coordinated beamforming, or the resource region of the hierarchical coordinated beamforming.

6. The method of claim 5, wherein the message requesting the hierarchical coordinated beamforming includes an identification of a micro cell interfering with at least one micro terminal, a channel quality index of the micro base station, a precoding matrix index of the micro base station, or a value of channel state information of the micro base station.

7. A non-transitory computer-readable medium comprising a program for instructing a computer to perform the method of claim 1.

8. The method of claim 1, wherein the message requested by the micro base station indicates:
   the coordinated silencing in response to a magnitude of second interference from the macro base station to the micro terminal exceeding a predetermined second threshold value and a magnitude of third interference from the other micro base station to the micro terminal being less than a predetermined third threshold value,
   the coordinated beamforming in response to the magnitude of second interference from the macro base station to the micro terminal being less than the predetermined second threshold value and the magnitude of third interference from the other micro base station to the micro terminal exceeding the predetermined third threshold value, or
   the hierarchical coordinated beamforming in response to the magnitude of second interference from the macro base station to the micro terminal exceeding the predetermined second threshold value and the magnitude of third interference from the other micro base station to the micro terminal exceeding the predetermined third threshold value.

9. A communication method executed by a terminal to achieve interference control in a hierarchical cellular network including a macro base station serving a macro terminal, a micro base station serving a micro terminal, and another micro base station, the method comprising:
   in response to the terminal being served by the macro base station,
      transmitting, to the macro base station, a message requesting a ranging expansion, in response to a magnitude of first interference from the micro base station to the terminal exceeding a predetermined first threshold value;

receiving, from the macro base station, a ranging expansion message including a bias value determined based on the message requesting the ranging expansion;

performing the ranging expansion using the bias value, and in response to the terminal being served by the micro base station, transmitting, to the micro base station, a message requesting a coordinated beamforming or a hierarchical coordinated beamforming, based on second interference from the macro base station to the terminal and third interference from the another micro base station to the terminal, wherein the performing comprises determining, based on a message requested by the micro base station, whether to perform a first combination of a hierarchical coordinated beamforming, a coordinated silencing, and the ranging expansion, or a second combination of the ranging expansion and the hierarchical coordinated beamforming.

10. The method of claim 9, wherein the message requesting the ranging expansion includes an amount of the first interference or a bias value requested by the terminal during the ranging expansion.

* * * * *